US010726861B2

(12) United States Patent
Flaks et al.

(10) Patent No.: US 10,726,861 B2
(45) Date of Patent: Jul. 28, 2020

(54) SEMI-PRIVATE COMMUNICATION IN OPEN ENVIRONMENTS

(75) Inventors: Jason S. Flaks, Bellevue, WA (US); Avi Bar-Zeev, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 1409 days.

(21) Appl. No.: 12/946,701

(22) Filed: Nov. 15, 2010

(65) Prior Publication Data

US 2012/0120218 A1 May 17, 2012

(51) Int. Cl.
| | |
|---|---|
| *G10L 19/00* | (2013.01) |
| *H04N 7/18* | (2006.01) |
| *H04R 3/00* | (2006.01) |
| *G10L 21/028* | (2013.01) |
| *H04S 7/00* | (2006.01) |
| *G10L 21/0216* | (2013.01) |

(52) U.S. Cl.
CPC .......... *G10L 21/028* (2013.01); *H04S 7/303* (2013.01); *A63F 2300/572* (2013.01); *G10L 2021/02166* (2013.01); *H04M 2203/1066* (2013.01); *H04M 2203/65* (2013.01); *H04R 2203/12* (2013.01)

(58) Field of Classification Search
CPC combination set(s) only.
See application file for complete search history.

(56) References Cited

U.S. PATENT DOCUMENTS

| | | | |
|---|---|---|---|
| 4,288,078 | A | 9/1981 | Lugo |
| 4,627,620 | A | 12/1986 | Yang |
| 4,630,910 | A | 12/1986 | Ross et al. |
| 4,645,458 | A | 2/1987 | Williams |
| 4,695,953 | A | 9/1987 | Blair et al. |
| 4,702,475 | A | 10/1987 | Elstein et al. |

(Continued)

FOREIGN PATENT DOCUMENTS

| | | |
|---|---|---|
| CN | 1321039 A | 11/2001 |
| CN | 101254344 B | 6/2010 |

(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — Christopher S Kelley
*Assistant Examiner* — Asmamaw G Tarko
(74) *Attorney, Agent, or Firm* — Alleman Hall Creasman & Tuttle LLP

(57) ABSTRACT

A system and method providing semi-private conversation using an area microphone between one local user in a group of local users and a remote user. The local and remote users may be in different physical environments, using devices coupled by a network. A conversational relationship is defined between a local user and a remote user. The local user's voice is isolated from other voices in the environment, and transmitted to the remote user. Directional output technology may be used to direct the local user's utterances to the remote user in the remote environment.

18 Claims, 12 Drawing Sheets

(56) References Cited

U.S. PATENT DOCUMENTS

| | | | |
|---|---|---|---|
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 6/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,306,039 B1 * | 10/2001 | Kaji .............. A63F 13/12 |
| | | 345/418 |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,935,959 B2 * | 8/2005 | Danieli ............ A63F 13/12 |
| | | 463/35 |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |

(56) References Cited

U.S. PATENT DOCUMENTS

| | | | |
|---|---|---|---|
| 7,683,954 | B2 | 3/2010 | Ichikawa et al. |
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 * | 6/2010 | Hunter ............ 345/473 |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2002/0086733 | A1 * | 7/2002 | Wang ............ A63F 13/12 463/42 |
| 2003/0216178 | A1 * | 11/2003 | Danieli et al. ......... 463/35 |
| 2004/0109023 | A1 | 6/2004 | Tsuchiya |
| 2004/0109059 | A1 * | 6/2004 | Kawakita ........... 348/143 |
| 2004/0220800 | A1 * | 11/2004 | Kong et al. ......... 704/205 |
| 2006/0204012 | A1 * | 9/2006 | Marks et al. ........ 381/26 |
| 2006/0239471 | A1 * | 10/2006 | Mao ............ H04R 1/406 381/92 |
| 2006/0248016 | A1 * | 11/2006 | Ginter et al. ......... 705/54 |
| 2007/0061142 | A1 * | 3/2007 | Hernandez-Abrego ....... G10L 17/04 704/247 |
| 2007/0211067 | A1 * | 9/2007 | Hunter ............ G06T 13/40 345/581 |
| 2008/0026838 | A1 | 1/2008 | Dunstan et al. |
| 2008/0133336 | A1 | 6/2008 | Altman et al. |
| 2008/0288219 | A1 * | 11/2008 | Tashev ............ H04B 7/0854 702/190 |
| 2009/0111443 | A1 * | 4/2009 | Gupta ............ 455/416 |
| 2009/0150146 | A1 | 6/2009 | Cho et al. |
| 2009/0190774 | A1 | 7/2009 | Wang et al. |
| 2009/0209345 | A1 | 8/2009 | Okada |
| 2009/0210491 | A1 * | 8/2009 | Thakkar ........... H04L 12/1822 709/204 |
| 2009/0239650 | A1 * | 9/2009 | Alderucci et al. ......... 463/25 |
| 2009/0290069 | A1 * | 11/2009 | De Vaan et al. ......... 348/687 |
| 2011/0007142 | A1 * | 1/2011 | Perez et al. .......... 348/77 |
| 2011/0182481 | A1 * | 7/2011 | Dernis ............ G06K 9/00892 382/116 |
| 2012/0259638 | A1 * | 10/2012 | Kalinli ........... 704/270 |

FOREIGN PATENT DOCUMENTS

| | | |
|---|---|---|
| EP | 0583061 A2 | 2/1994 |
| EP | 1364690 A2 | 11/2003 |
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | WO2010107490 A1 | 9/2010 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Chinese Office Action dated Dec. 4, 2013, Chinese Patent Application No. 201110378008.8.

Audio Spotlight by Holosonics [online]. "Sonic Spotlight." Holosonic Research Labs, Inc. Retrieved on Jun. 28, 2010, pp. 1-2. Retrieved from the Internet: <URL: http://www.holosonics.com/products.html>.

(56) References Cited

OTHER PUBLICATIONS

Truta, Filip. "Guide to Voice Communication with Xbox 360." Softpedia [online], Dec. 28, 2007 [retrieved on Jun. 23, 2010], pp. 1-3. Retrieved from the Internet: <URL: http://news.softpedia.com/news/Guide-to-Voice-Communication-with-Xbox-360-74954.shtml>.

Amendment dated Apr. 21, 2014, in Chinese Patent Application No. 201110378008.8.

* cited by examiner

SEMI-PRIVATE COMMUNICATION IN OPEN ENVIRONMENTS

BACKGROUND

Computer gaming systems provide online experiences which allow user to play games with other gamers connected via a local or wide area network. In some cases, one user is connected to a gaming console playing a game at one physical location and communicates with another user at another physical location. Currently each user may wear a headset with an earphone and microphone in order to communicate. This allows users participating as a team who may be located in different physical locations to communicate with each other, with non-teammate players in the same physical environment only hearing minimal ambient crosstalk (and only one side of the conversation). One such technique for use of multiplayer real-time voice communication in a gaming device is described in U.S. Pat. No. 6,935,959, assigned to the assigned of the present application, and hereby fully incorporated herein by reference.

Motion tracking systems have been developed which include microphones may eliminate the need for controllers and headsets. Techniques exist to allow a game or application to identify users within the field of view through a variety of mechanisms, including a three-dimensional depth camera capable of sensing user traits such as size, facial features, clothing color, etc. Voice recognition techniques also exist to identify perceived user voices through a variety of mechanisms including a microphone array.

SUMMARY

Technology is described to provide for semi-private conversations between users when using an area microphone to communicate with other users. The technology is advantageous in a situation where one local user in a group of local users wishes to communicate privately with a remote user. The local and remote users may be coupled by a network. A conversational relationship is defined between a local user and a remote user, the local user's voice is isolated from other voices detected by and within range of the area microphone, and isolated utterances of the local user are transmitted to the remote user. Directional transmission technology may be used to output the local user's utterances to the remote user in the remote environment. The semi-private conversation experience is provided without the use of traditional sound isolating technology, such as microphones and head-sets.

In one embodiment, the technology includes a method of providing a semi-private conversation between a local user and a remote user. Voice utterances are received from a local user in a first physical space via an area microphone. The local user's utterances are localized and associated with the first user. The isolated utterances of the first user are directed to a second user in a second physical environment based on a conversational relationship defined between the first and second user. The first and second user may communicate in this manner using a local and a remote processing device coupled to each other by a network.

DETAILED DESCRIPTION

Embodiments of the present technology will now be described with reference to FIGS. 1-13. Technology is presented to provide for semi-private conversation between one local user in a group of local users and a remote user, where an area microphone is used to detect the local user's conversation. The local and remote users may coupled by a network. A conversational relationship is defined between a local user and a remote user. The conversational relationship may be used for communicating information between users interacting together in, for example, a game. The local user's voice is isolated from other voices detected by and within range of the area microphone and then transmitted to the remote user. Directional transmission technology may be used to output the local user's utterances to the remote user in the remote environment. The semi-private conversation experience is provided without the use of traditional sound isolating technology, such as microphones and head-sets.

Figure 1:
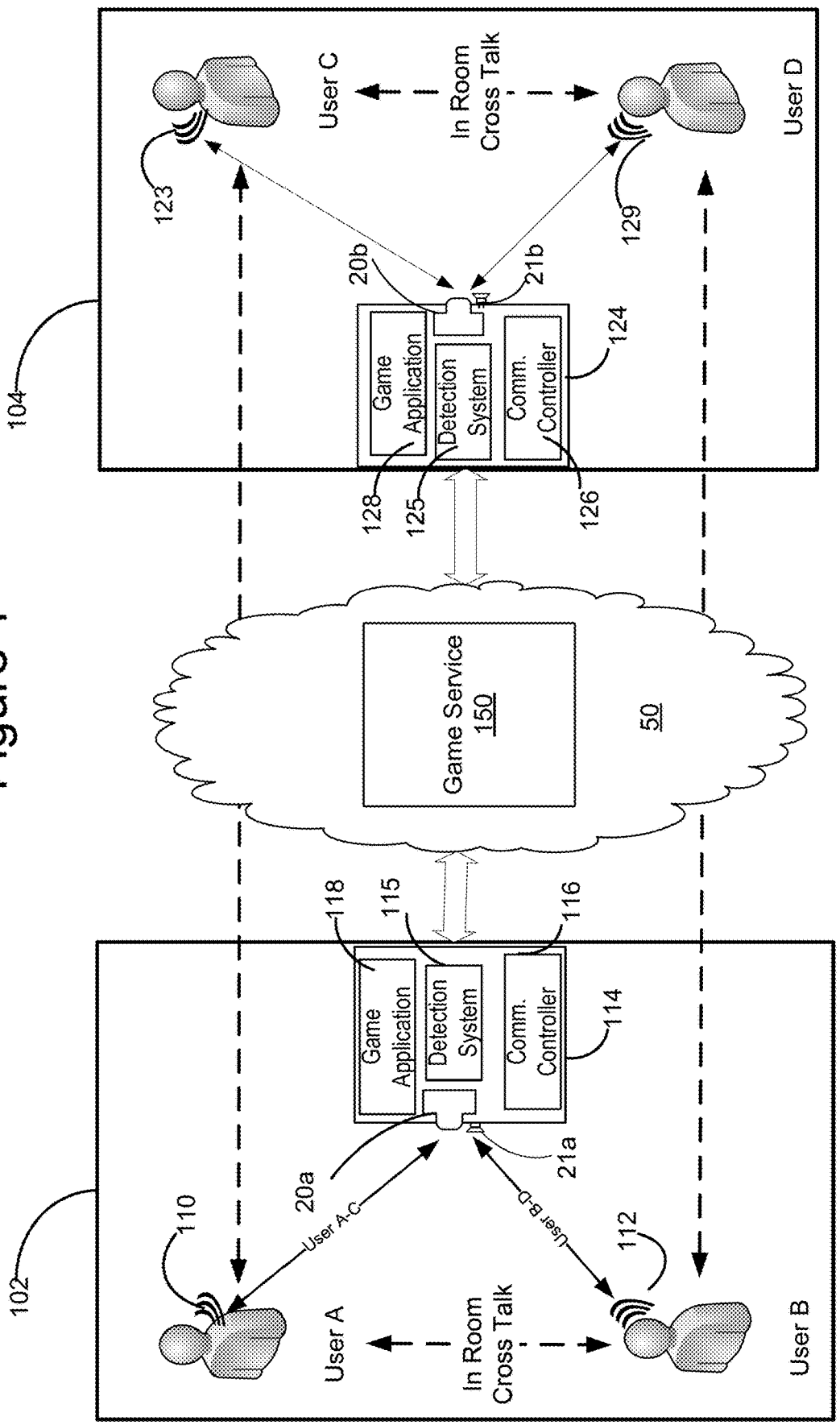
FIG. 1 illustrates two sets of users located in different physical environments communicating via processing devices coupled via a network.

FIG. 1 illustrates local and remote users in different physical environments 102 and 104. FIG. 1 illustrates two physical environments 102, 104 in which users operating respective computing devices 114, and 124 interact which the devices using a capture device 20. In one example, all users may be participants in a networked game and have a teammate in a different physical environment. In the example shown in FIG. 1, user A and user C are teammates, and user B and user D are teammates. As teammates, users A/C and B/D may need to communicate information relative to the game to the exclusion of the other team. However, because user A and B are in the same physical environment 102 and users C and D are in the same physical environment 104, in room crosstalk will occur between users A and B and users C and D.

The present technology allows for the detection of utterances from a user in one physical environment to be isolated and transmitted to a specific user in a different physical environment, thereby providing a semi-private conversation. Because of in-room cross talk between users in the same physical environment, some loss of privacy may occur.

In physical environment 102, users A and B participate with a game application 118 on computing device 114. The game application 118 includes or communicates with a communications controller 116 which directs communications from each respective user A and B to their corresponding teammates C and D in the different physical environment 104. A detection system 115 associates voice utterances from each user with the user from whom the utterance was made. Likewise, users C and D interact with game application 128 which communicates with communication controller 126 and detection system 125. Each processing device is coupled to a network 50 which allows the applications to communicate with each other and a remote gaming application 128, corresponding communications controller 126 and processing device 124 in the second physical environment 104. In one embodiment, a gaming service 150, provides connection, scoring and other services for the game application. One such gaming service is the XBOX Live service available from Microsoft Corporation. The gaming service allows users to enter virtual areas such as game "rooms" or tournaments, and provides connection services to route communications between respective game applications and communication controllers. In alternative embodiments, gaming applications 118 and 128 may communicate directly.

Figure 2:
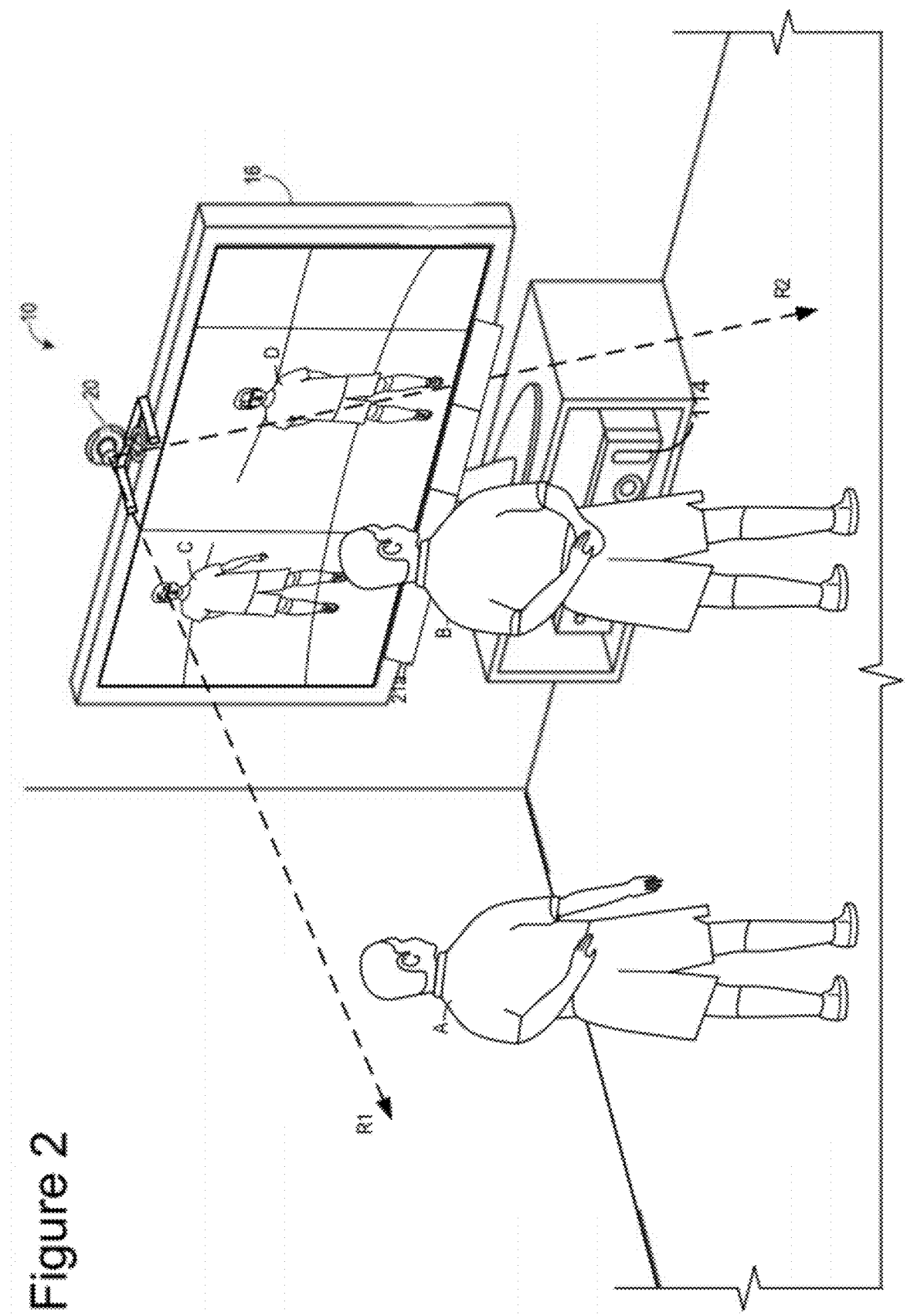
FIG. 2 illustrates an example embodiment of a target recognition, analysis and tracking system with a user playing a game.

FIG. 2 is a perspective representation of users A and B in conjunction with a processing device 114 and remote users C and D at the remote location 104. In the example shown in FIGS. 1 and 2, a capture device 20, illustrated and described below with respect to FIG. 3, captures the movements of users A and B in one physical environment 102 and users C and D in another physical environment 104, transmits the information provided by user A and user B to the processing device 114, detection system 115, game application 118 and the communications controller 116. The game application may use the motions of the users to control activity within the game and/or may transmit images of the users (or representations of the users) via the network in a virtual gaming environment.

In further alternative embodiments, the applications 118 and 128 are applications other than gaming applications. One example includes a presentation application or virtual meeting application, allowing users to direct communications to remote users to the exclusion of other in-room users.

In the example shown in FIG. 1, an utterance 110 which emanates from user A will be detected by a capture device 20a coupled to the processing device 114. Detection system 115 will determine which user the utterance emanated from and associate the user's voice with the individual user. The communications controller, in conjunction with the application, isolate the speech of the user and forward the utterance to a specific remote user. A speaker or speaker array 21a, 21b outputs sound to the users. An utterance 110 from user A will be routed to the network 50, and to communications controller 126 to be routed to user C via a speaker or array 21b. Similarly, an utterance 112 from user B will be detected by device 20a, directed by the communications controller 116 to the network 50 and to user D via speaker 21b. Communications back from user C (utterance 121) and user D (utterance 129) are communicated through capture device 20b, communications controller 126 back through the network 50 to communications controller 116 to be directed to user A and B, respectively, by speaker 21a.

While the technology will be discussed with reference to communication across a network, it will be recognized that the principles of the present technology may be utilized to direct communications between locally connected users in a particular physical environment.

Figure 3:
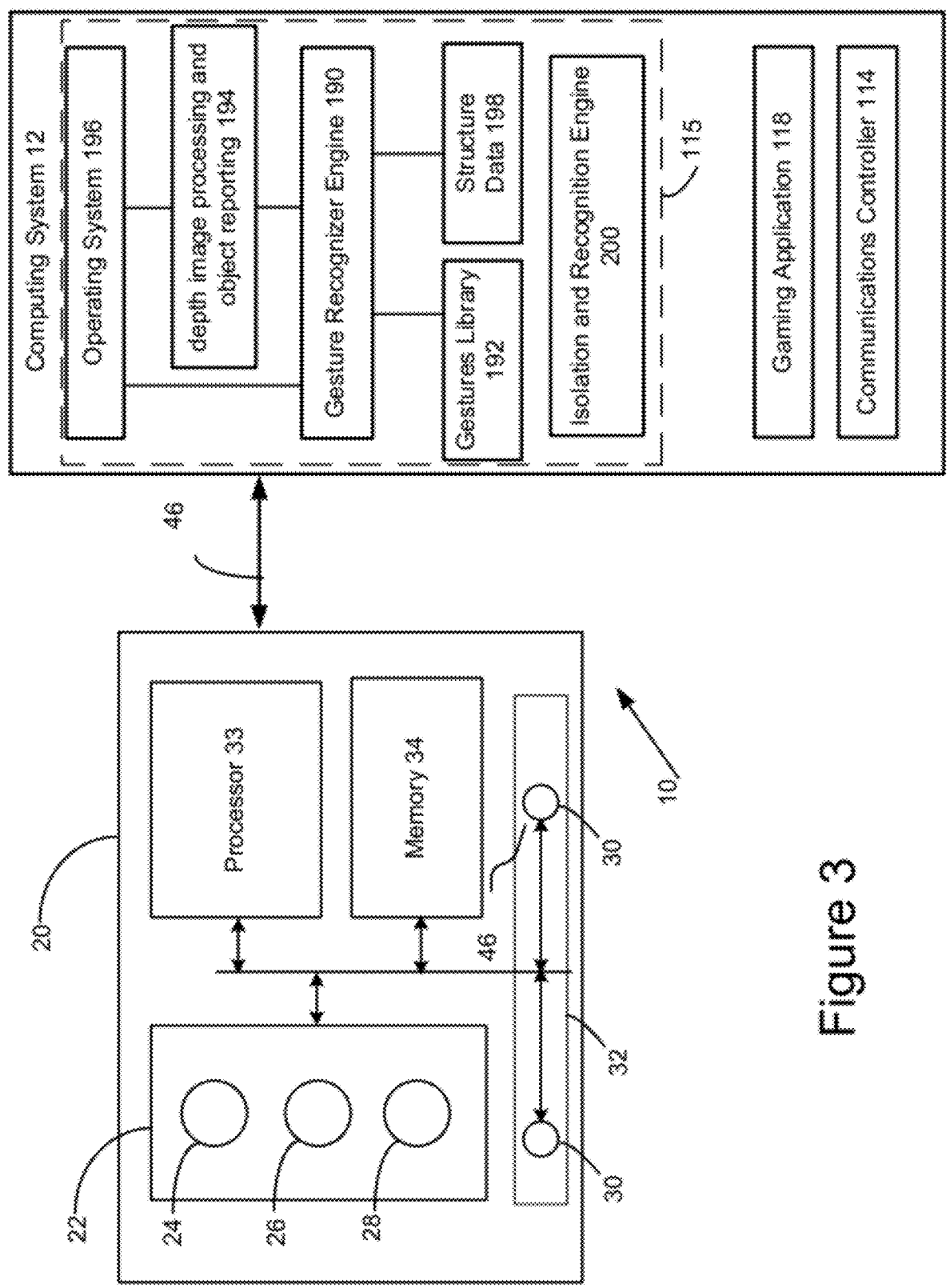
FIG. 3 is a block diagram of a target recognition, analysis and tracking system.

It will be further recognized that while the embodiments of FIGS. 1 and 2 illustrate both users in both physical environments interacting with a capture device, alternate embodiments of the technology include one or more users in one physical environment utilizing a headset earphone and microphone (such as Microsoft Part no P6F-0001 Xbox 360 Wireless Headset or Microsoft part no B$D-0001 Xbox 360 headset). For example, users in one physical environment 102 may interact with the capture device illustrated in FIGS. 1 and 2, while users in the other physical environment FIG. 3 illustrates one embodiment of a system for implementing the present technology. In one embodiment, a system includes a target recognition, analysis, and tracking system 10 which may be used to recognize, analyze, and/or track one or more human targets such as the users A through B. Embodiments of the target recognition, analysis, and tracking system 10 include a computing environment 12 for executing a gaming or other application, and an audiovisual device 16 for providing audio and visual representations from the gaming or other application. The system 10 further includes a capture device 20 including one or more depth perception cameras and a microphone array including two or more microphones. The capture device 20 communicates with the computing environment 12 so that the computing environment 12 may control the output to audiovisual device 16 based in part on the information received from capture device 20. Each of these components is explained in greater detail below.

As shown in FIG. 2, in an example embodiment, the application executing on the computing environment 12 may be a multiplayer game. Based on information received from capture device 20, the computing environment 12 may use the audiovisual device 16 to provide visual representations of each user A-D as player avatars or present images of other users in a different physical environment. Users may move into and out of the field of view.

Although not critical to the present technology, the users A-D may perform gestures which are recognized by a software engine running on computing environment 12, so that a user's avatar performs some action upon recognition of a gesture by that user. While four users are shown in the example of FIGS. 1-3 it is understood that the present technology may operate with more or less that four users in embodiments. Moreover, the present technology is not limited to correlating a voice with the speaker in the gaming context, but rather it may be used in a wide variety of other instances where it is desirable to identify a person based on a correlation of their voice with their body.

FIG. 3 illustrates an example embodiment of the capture device 20 (20a or 20b) that may be used in the target recognition, analysis, and tracking system 10. In an example embodiment, the capture device 20 may include an image camera component 22. The component 22 is configured to capture three-dimensional video images in the field of view via any suitable technique including, for example, time-of-flight, structured light, stereo image, or the like. According to one embodiment, the image camera component 22 may organize the calculated depth information into "Z layers," or layers that may be perpendicular to a Z axis extending from the depth camera along its line of sight.

Additional details relating to cameras which may form part of capture device 20 are set forth in U.S. patent application Ser. No. 12/474,655, "Gesture Tool" filed on May 29, 2009, and hereby fully incorporated herein by reference; and U.S. patent application Ser. No. 12/391,150, "Standard Gestures," filed on Feb. 23, 2009 and hereby fully incorporated herein by reference; each of which applications is incorporated herein by reference in its entirety. However, in general, as shown in FIG. 2, the image camera component 22 may capture a depth image having a two-dimensional (2-D) pixel area of the captured scene where each pixel in the 2-D pixel area may represent a length in, for example, centimeters, millimeters, or the like of an object in the captured scene from the camera. The image camera component 22 is able to image objects within a field of view, represented by rays R1 and R2 in FIGS. 1A and 1B.

The technology is advantageously utilized in a target recognition, analysis, and tracking system such as that disclosed in U.S. patent application Ser. No. 12/475,094 entitled "Environment And/Or Target Segmentation", filed May 29, 2009 and hereby fully incorporated herein by reference; U.S. patent application Ser. No. 12/603,437, "Pose Tracking Pipeline," filed on Oct. 21, 2009, and hereby fully incorporated herein by reference; U.S. patent application Ser. No. 12/475,308, "Device for Identifying and Tracking Multiple Humans Over Time," filed on May 29, 2009, and hereby fully incorporated herein by reference; "Motion Detection Using Depth Images," filed on Dec. 18, 2009, and hereby fully incorporated herein by reference; U.S. patent application Ser. No. 12/575,388, "Human Tracking System," filed on Oct. 7, 2009, and hereby fully incorporated herein by reference U.S. patent application Ser. No. 12/422,661, "Gesture Recognizer System Architecture," filed on Apr. 13, 2009 and hereby fully incorporated herein by reference; and U.S. patent application Ser. No. 12/511,850, entitled "Auto Generating a Visual Representation," filed 29 Jul. 2009, fully incorporated herein by reference.

As shown in FIG. 3, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28.

According to another embodiment, the capture device 20 may include two or more physically separated cameras that may view a scene from different angles, to obtain visual stereo data that may be resolved to generate depth information. In either embodiment, the image camera component 22 is able to determine the orientation of the people within the field of view relative to each other, and is able to calculate the angle of each person in the field of view relative to the capture device 20.

The capture device 20 may provide the depth information and images captured by, for example, the 3-D camera 26 and/or the RGB camera 28, and a skeletal model that may be generated by the capture device 20 to the computing environment 12 via the communication link 36. A variety of known techniques exist for determining whether a target or object detected by capture device 20 corresponds to a human target. For example, the capture device 20 may capture depth information of a capture area that may include a human target. The depth image may then be analyzed to determine whether the depth image includes a human target and/or non-human targets. Portions of the depth image may be flood filled and compared to a pattern to determine whether the target may be a human target. If one or more of the targets in the depth image includes a human target, the human target may be scanned.

Figure 5:
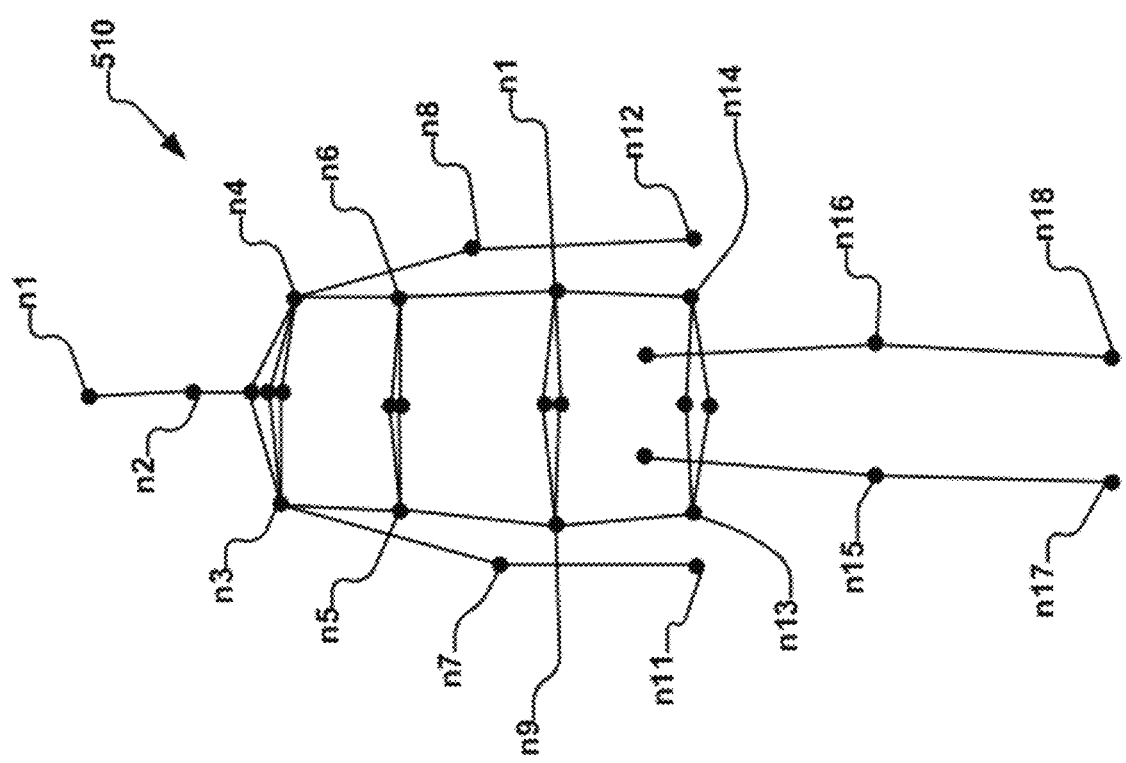
FIG. 5 is a depiction of a skeletal model used by the target recognition, analysis and tracking system.

Skeletal mapping techniques may then be used to determine various spots on that user's skeleton, joints of the hands, wrists, elbows, knees, nose, ankles, shoulders, and where the pelvis meets the spine. Other techniques include transforming the image into a body model representation of the person and transforming the image into a mesh model representation of the person. The skeletal model may then be provided to the computing environment 12 such that the computing environment may track the skeletal model and utilize the tracking for any of a number of purposes, including gesture recognition for application control. An example of a skeletal model used for tracking is illustrated in FIG. 5.

The capture device 20 may further include a microphone array 32 including two more microphones 30. The array of microphones capture user utterances within the physical environment. This may include utterances within the field of view of the camera and outside the field of view. The microphones 30 receive audio utterances provided by one or more of users A-D.

In the embodiment shown, there are two microphones 30, but it is understood that the microphone array may have more than two microphones in further embodiments. The microphones may be aligned in a common vertical plane (i.e., at the same height) for embodiments where it may not be critical to resolve relative position along a vertical axis. However, it is further understood that the present technology may employ two to four or more cameras lying along different vertical lines and horizontal lines. In such embodiments, the microphone array would be able to employ acoustic localization techniques along both vertical and horizontal planes to pinpoint the location of one or more voices in three-dimensional space.

The microphones 30 in the array may be positioned near to each other as shown in the figures, such as for example one foot apart. It is understood that in further embodiments, the microphones may be spaced closer together, or farther apart, for example at corners of a wall to which the capture device 20 is adjacent.

The microphones 30 in the array may be synchronized with each other, and each may include a transducer or sensor that may receive and convert sound into an electrical signal. Techniques are known for differentiating sounds picked up by the microphones to determine whether one or more of the sounds is a human voice. Microphones 30 may include various known filters, such as a high pass filter, to attenuate low frequency noise which may be detected by the microphones 30.

Within given tolerances, the array 32 is also able to determine the orientation of the perceived voices relative to each other, and is able to calculate the angle of each voice source relative to the microphone array using acoustic localization techniques.

In an example embodiment, the capture device 20 may further include a processor 33 that may be in operative communication with the image camera component 22 and microphone array 32. The processor 33 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction. The processor 33 may also perform the above described operations relating to acoustic localization.

The capture device 20 may further include a memory component 34 that may store the instructions that may be executed by the processor 33, images or frames of images captured by the 3-D camera or RGB camera, audio data from microphones 30 or any other suitable information or the like. According to an example embodiment, the memory component 34 may include random access memory (RAM), read only memory (ROM), cache, Flash memory, a hard disk, or any other suitable storage component. As shown in FIG. 3, in one embodiment, the memory component 34 may be a separate component in communication with the image capture component 22, microphone array 32 and the processor 33. According to another embodiment, the memory component 34 may be integrated into the processor 33, the image capture component 22 and/or microphone array 32.

As shown in FIG. 3, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36. Image and audio data from capture device 20 may also be communicated to the computing environment 12 via the communication link 36.

Computing system 12 may comprise one or more of the hardware embodiments illustrated in FIGS. 12 and 13 below. The capture device 20 may provide the depth information and images captured by, for example, the 3-D camera 36 and/or the RGB camera 38, including a skeletal model that may be generated by the capture device 20, to the computing environment 12 via the communication link 46. The computing environment 12 may then use the skeletal model, depth information, and captured images to track users in the field of view for an application.

Computing system 12 may include a gestures library 192, structure data 198, gesture recognition engine 190, depth image processing and object reporting module 194 and operating system 196. Depth image processing and object reporting module 194 uses the depth images to track motion of objects, such as the user and other objects. To assist in the tracking of the objects, depth image processing and object reporting module 194 uses gestures library 190, structure data 198 and gesture recognition engine 190.

Structure data 198 includes structural information about objects that may be tracked. For example, a skeletal model of a human may be stored to help understand movements of the user and recognize body parts. Structural information about inanimate objects may also be stored to help recognize those objects and help understand movement.

Gestures library 192 may include a collection of gesture filters, each comprising information concerning a gesture that may be performed by the skeletal model (as the user moves). A gesture recognition engine 190 may compare the data captured by the cameras 36, 38 and device 20 in the form of the skeletal model and movements associated with it to the gesture filters in the gesture library 192 to identify when a user (as represented by the skeletal model) has performed one or more gestures. Those gestures may be associated with various controls of an application. Thus, the computing system 12 may use the gestures library 190 to interpret movements of the skeletal model and to control operating system 196 or an application (now shown) based on the movements.

In one embodiment, depth image processing and object reporting module 194 will report to operating system 196 an identification of each object detected and the location of the object for each frame. Operating system 196 will use that information to update the position or movement of an avatar or other images in the display or to perform an action on the provided user-interface.

More information about recognizer engine 190 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009, both of which are incorporated by reference herein in their entirety. More information about motion detection and tracking can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," filed on May 29, 2009, both of which are incorporated herein by reference in their entirety.

Also shown in FIG. 3 is a voice recognition engine 200, gaming application 118 and communications controller 114. The voice recognition engine determines user voice patterns and isolates user utterances. The recognition engine in conjunction with the gesture dept image processing an object reporting engine 194 can map user utterance to a tracked skeletal model. Where multiple user voices are present, the recognition engine separates the user utterances based on the user speech. This can then be routed by the communications controller in a manner similar to that disclosed in, for example, U.S. Pat. No. 6,935,959.

Figure 4:
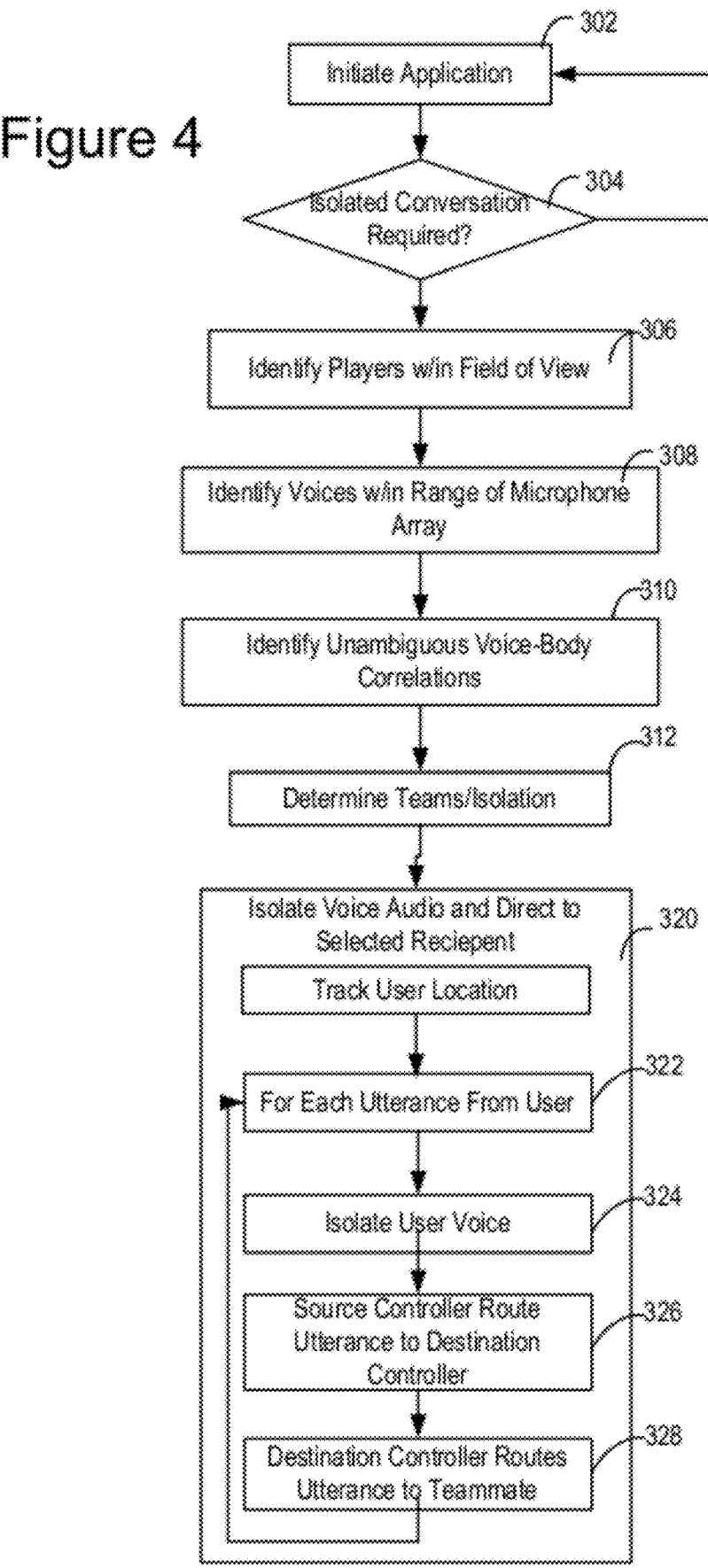
FIG. 4 is a flowchart illustrating a method in accordance with the present technology.

FIG. 4 illustrates a method in accordance with the present technology to isolate utterances detected by a microphone from application users in a physical environment, and direct the isolated utterances to specific other users in another physical environment. At step 302, an application utilizing user communication routing is initiated. In one embodiment, the application may comprise a game application or any other application in which a console or computing device is utilized to provide local or network based voice communication between users. At step 304, determination is made by the application that isolated conversation between two or more users is required. The determination for isolated communication can be made by evaluating the number of users participating in the application, identifying which users need to communicate with each other in isolation from other users, and using this information to route communications between various users based on the technology discussed herein.

Using the technology discussed above with respect to FIGS. 1-3, at step 306, potential players or users within the field of view of the capture device are identified at 306. At 308, voices within range of the microphone array of the capture device are identified. Voices may be identified using the techniques discussed below with respect to FIGS. 8 and 9.

At step 310, once voices are identified using the techniques discussed herein, a voice to user correlation is performed. In one embodiment, this may include creating a skeletal model for a user and tracking the model to steer the microphone array to detect utterances from users based on the position of the user and model. Alternatively, a voice print may be assigned to the user skeletal model when tracked. At 312, the application program determines the which users are in a conversational relationship. In one example, a conversational relationship may occur between teammates in a game. In step 312, the conversational relationship is made between users in different physical environments, or in the physical environment. In this context, the conversational relationship should be as exclusive as possible to those in the relationship, to the exclusion of other users in the same and different physical environments. Once the relationship is determined and voices isolated, utterances from each use may be isolated and directed to selected other users as the utterances occur at 320.

At step 320, voice utterances emanating from detected players within the field of view are isolated and directed to selected recipients based on the voice-body correlations and the team's/isolation characteristics identified in steps 310 and 312. Step 320 may include tracking the user location in the environment at 321 so that associations between the user location and the location of a user voice may occur. A user voiceprint is assigned to a skeletal model tracked by the system and the known position of the tracked model used to determine the source of the utterance. Associating a voice to a skeletal model has additional benefit of allowing the microphone array detection for the user to be steered in the direction of the user location. Alternatively, tracking need not be used, and the source of the utterance (i.e. which user the utterance came from) can be determined at the time of the utterance.

For each utterance and for each user A-D, tracking and routing the utterance occurs for example by sub-steps 322-328. At 322 for each utterance from any particular user, the user's voice utterance is isolated at 324. Utterance isolation may occur using the processing techniques described below or the techniques noted above. A focusing of the microphone array at the known location of the skeleton associated with the user allows for the array to be tuned to detect and isolate utterances from an individual user. At 326, the utterance from the user is then routed by the communications controller to a teammate based on the conversation relationship as identified by the application. This includes routing by the communication controller at in the source physical environment to the correct destination communications controller. At 328, the destination communications controller directs the utterance to the user's teammate based on the communication relationship. As described below, this includes using directional output devices to focus sound from the utterance at the teammate to whom it is directed.

FIG. 5 illustrates an example of a skeletal model or mapping 840 representing a scanned human target that may be generated as part of step 306 of FIG. 4. According to one embodiment, the skeletal model 510 may include one or more data structures that may represent a human target as a three-dimensional model. Each body part may be characterized as a mathematical vector defining joints and bones of the skeletal model 510.

Skeletal model 510 includes joints n1-n18. Each of the joints n1-n18 may enable one or more body parts defined there between to move relative to one or more other body parts. A model representing a human target may include a plurality of rigid and/or deformable body parts that may be defined by one or more structural members such as "bones" with the joints n1-n18 located at the intersection of adjacent bones. The joints n1-n18 may enable various body parts associated with the bones and joints n1-n18 to move independently of each other or relative to each other. For example, the bone defined between the joints n7 and n11 corresponds to a forearm that may be moved independent of, for example, the bone defined between joints n15 and n17 that corresponds to a calf. It is to be understood that some bones may correspond to anatomical bones in a human target and/or some bones may not have corresponding anatomical bones in the human target.

The bones and joints may collectively make up a skeletal model, which may be a constituent element of the model. An axial roll angle may be used to define a rotational orientation of a limb relative to its parent limb and/or the torso. For example, if a skeletal model is illustrating an axial rotation of an arm, a roll joint may be used to indicate the direction the associated wrist is pointing (e.g., palm facing up). By examining an orientation of a limb relative to its parent limb and/or the torso, an axial roll angle may be determined. For example, if examining a lower leg, the orientation of the lower leg relative to the associated upper leg and hips may be examined in order to determine an axial roll angle.

Figure 6:
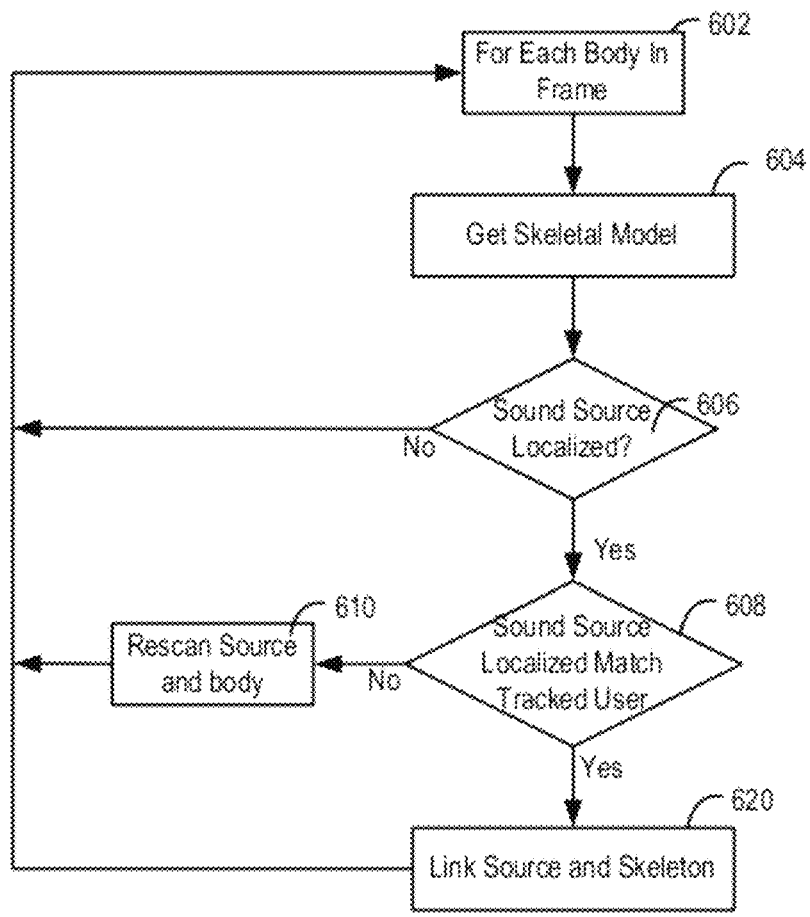
FIG. 6 is a flowchart illustrating a first method for associating a user voice with a user.

FIG. 6 illustrates a first embodiment of a method for mapping voice-body correlations discussed above with respect to FIG. 3 and step 310. At FIG. 6, in one embodiment, for each body in a particular frame or field of view at 602, a skeletal model for the body is generated at 604. The sound source of the user is determined to be localized at 606. Localization of a sound source occurs with respect to the description set forth below in FIGS. 8 and 9 or through any of a number of known techniques. If the sound source has not been localized, the method returns to step 602. If the sound source has been localized, then a determination is made at 608 as to whether or not the sound source matches a tracked user. If no matching occurs, then at 610 the source and body are re-scanned. If the sound source is localized and matches a tracked user, then the source and skeleton are linked at 620. Once the source and the skeletal model are linked, the system can focus the microphone array directionally at the postion of the user in the environment.

Figure 7:
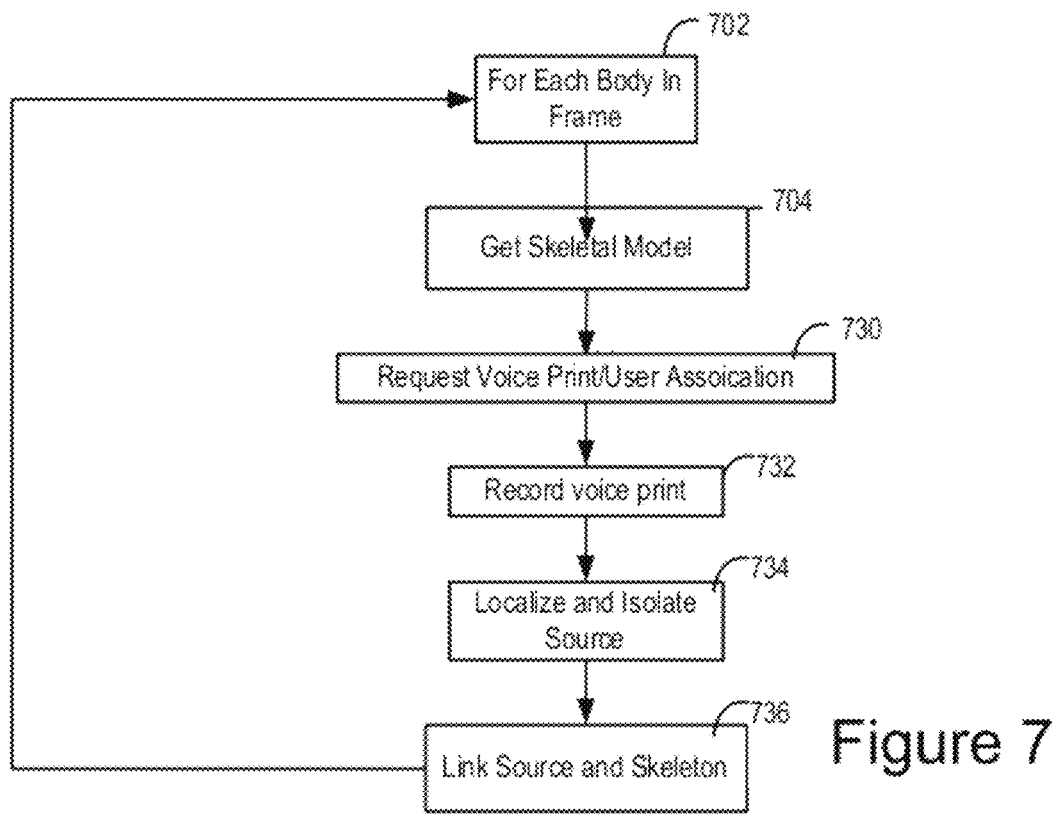
FIG. 7 is a flowchart illustrating a second method for associating a user voice with a user.

FIG. 7 illustrates an alternative embodiment wherein a user setup or correlation technique is used. At step 702, for each body in a particular frame or field of view, a skeletal model is retrieved at 704 and a voice print of a particular user associated with the skeletal model is requested at 730. The application may generate an interface which prompts the user to record specific information after which the user's utterances of the information are used to generate a voice print ro the user at 732. The voice print and the user skeleton are linked at 736.

Various techniques for localization of user voices may be employed with the present technology. One system and method for determining the orientation of perceived voices which may be used to map the voices to the determining system is discussed below with respect to FIGS. 8 and 9. Other various acoustic localization techniques are known.

In one embodiment, a tracking system need not be utilized, and localization of user voices may occur using other techniques. One embodiment may employ a time difference of arrivals (TDOA) technique having a first step of determining a set of TDOAs among different microphone pairs. That is, for each of a set of microphone pairs, the relative time difference between the arrival of the acoustic source signal at each of the microphones in the pair is determined. For example, the TDOA for two microphones i and j measuring the location, s, of an acoustic source may be determined by:

$$TDOA_{i,j} = (|s-m_i| - |s-m_j|)/c$$

where mi is the position of the ith microphone, mj is the position of the jth microphone and c is the speed of light.

TDOA techniques further include a second step of using the determined TDOA data and the microphone array geometry to estimate the location of the acoustic source. This second step may be performed by a variety of known methods including for example the maximum likelihood method, the triangulation method, the spherical intersection method, and the spherical interpolation method.

The TDOA method is one of a number of known methods which may be employed to locate the source of a perceived voice. Others include steered beamformer-based techniques and high-resolution spectral estimation-based techniques. Further details relating to microphone systems for acoustic localization may be found for example in U.S. Pat. No. 6,826,284, entitled "Method and Apparatus for Passive Acoustic Source Localization for Video Camera Steering Applications," and in a published paper by H. Wang and P. Chu, "Voice Source Localization for Automatic Camera Pointing System In Videoconferencing," in Proc. IEEE Int. Conf. Acoustics, Speech, and Signal Processing (ICASSP), Munich, Germany, April 1997, pp. 187-190. The above patent and paper are hereby incorporated by reference herein in their entirety. Where a technique allows acoustic source localization to a given tolerance using a single microphone, microphone array 32 may include one or more microphones.

Figure 8:
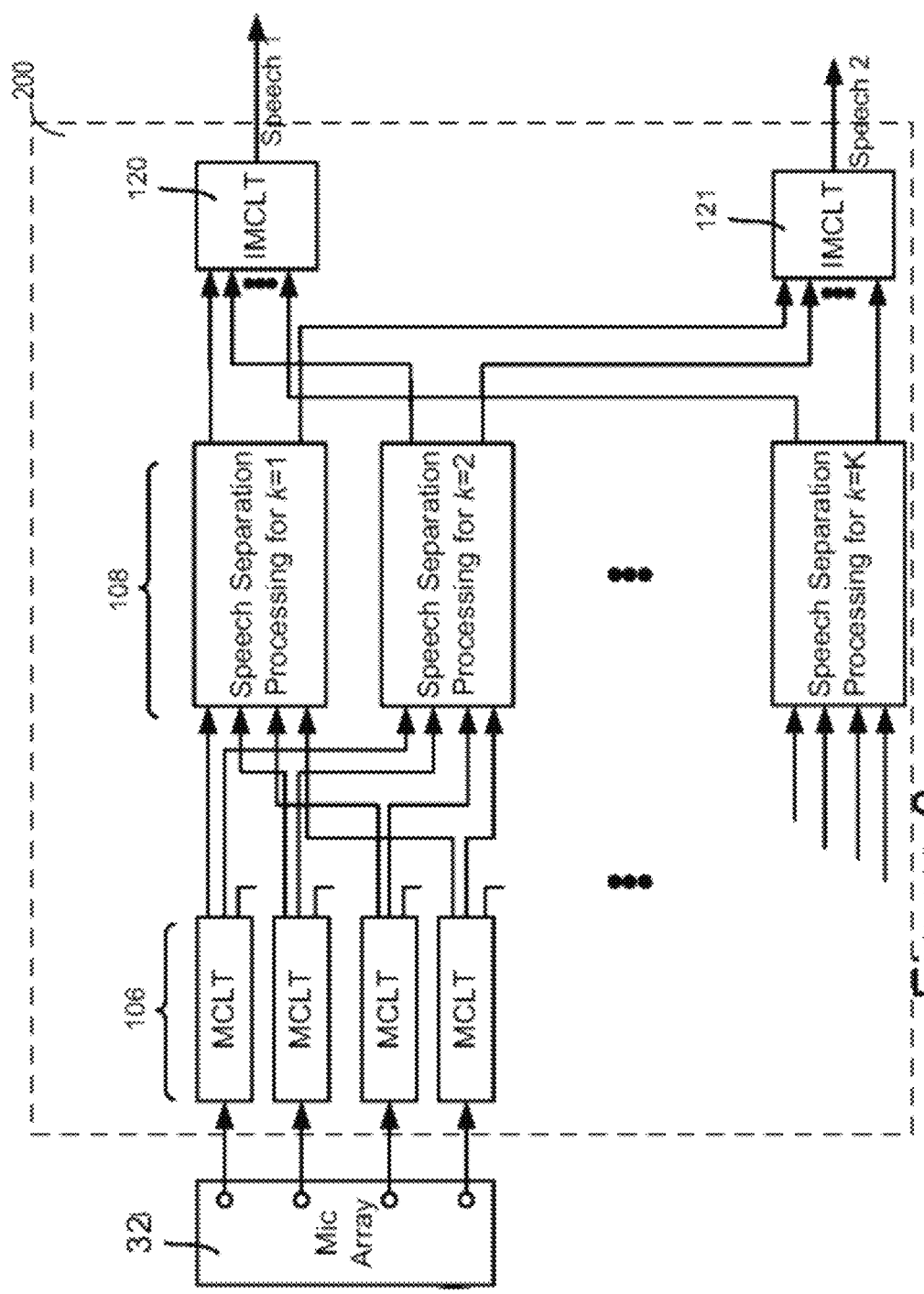
FIG. 8 is a block diagram representing components for sound separation in a sub-band domain.
Figure 9:
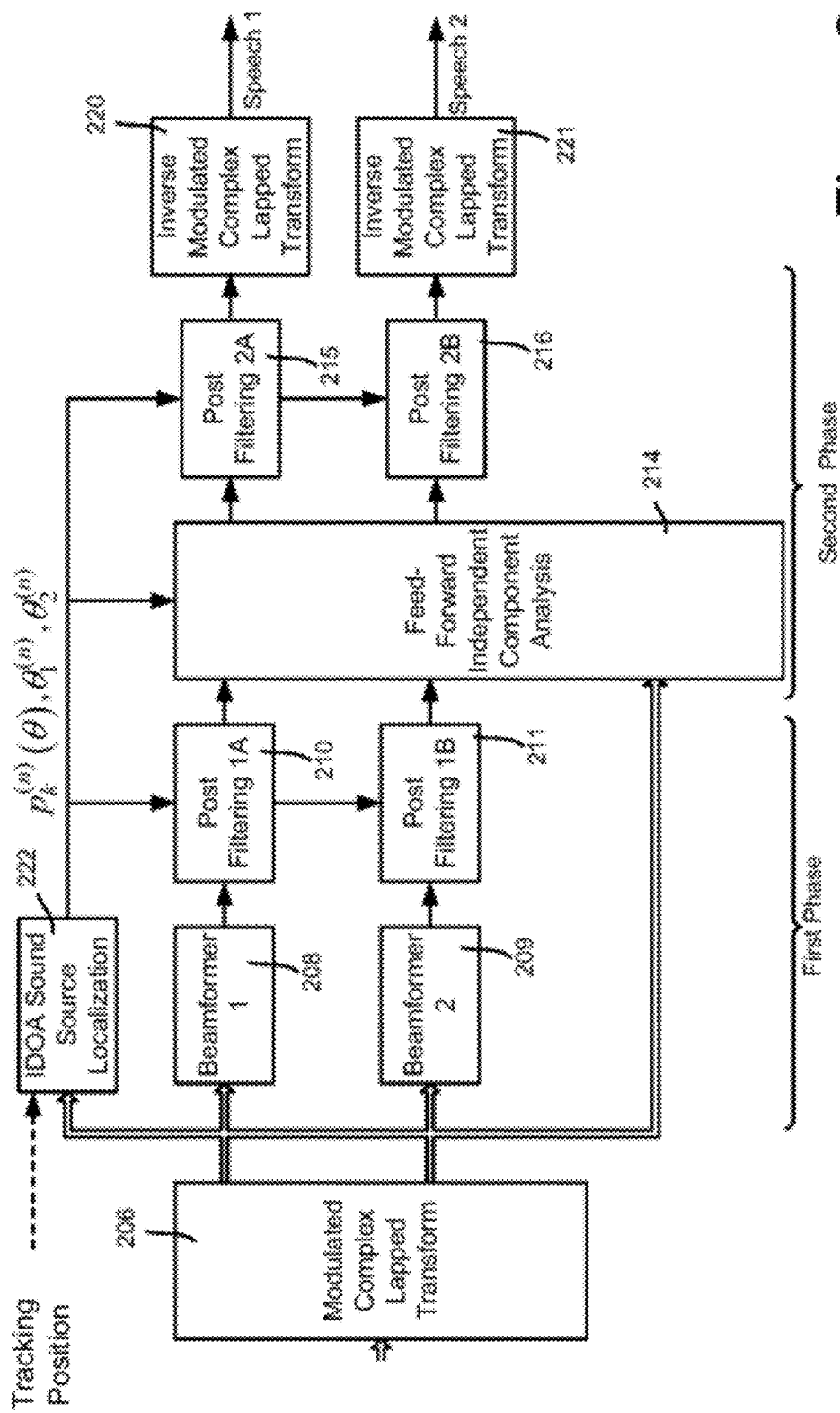
FIG. 9 is a flow diagram representing a two-phase sound separation system, including spatial filtering and regularized feed-forward independent component analysis.

FIGS. 8 and 9 illustrate a multiple phase process/system that can be utilized as the isolation and recognition engine 200 of FIG. 3. The process combines spatial filtering with regularization. Audio signals received at a microphone array 32 are transformed into frequency domain signals, such as via a modulated complex lapped transform, or Fourier transform, or any other suitable transformation to frequency domain. The frequency domain signals are processed into separated spatially filtered signals in a spatial filtering phase, including by inputting the signals into a plurality of beamformers (which may include nullformers). The outputs of the beamformers may be fed into nonlinear spatial filters to output the spatially filtered signals.

In a regularization phase, the separated spatially filtered signals are input into an independent component analysis mechanism that is configured with multi-tap filters corresponding to previous input frames. The separated outputs of the independent component analysis mechanism may be fed into secondary nonlinear spatial filters to output separated spatially filtered and regularized signals. Each of the separated spatially filtered and regularized signals into separated audio signals are then inverse-transformed into separated audio signals.

FIG. 8 shows a block diagram of regularized feed-forward independent component analysis (ICA) with instantaneous direction of arrival (IDOA) based post-processing. In FIG. 8, two independent speech sources 102 and 103 (such as users A and B) are separated in the subband domain. To this end, the time-domain signals captured using an array of multiple sensors (e.g., microphones) 32 are converted to the subband domain, in this example by using a modulated complex lapped transform (MCLT, blocks 106) that produces improved separation between frequency bands in an efficient manner. Note that any other suitable transform may be used, e.g., FFT.

The source separation may be performed using a demixing filter (blocks 108) in each individual frequency bin, where k=1, 2, . . . , K is the number of the frequency bins. The resulting signals may be converted back into the time domain using inverse MCLT (IMCLT), as represented by blocks 120 and 121.

Source separation per each frequency bin can be formulated as:

$$S = WY \qquad (1)$$

where S is the separated speech vector, W is the demixing matrix, and Y is the measured speech vector in a reverberant and noisy environment.

With respect to beamforming, beamformers may be time invariant, with weights computed offline, or adaptive, with weights computed as conditions change. One such adaptive beamformer is the minimum variance distortionless response (MVDR) beamformer, which in the frequency domain can be described as:

$$W^H = \frac{D^H R_n^{-1}}{D^H R_n^{-1} D} \qquad (2)$$

where D is a steering vector, $R_n$ is a noise covariance matrix, and W is a weights matrix. Often the noise only covariance $R_n$ is replaced by R, which is the covariance matrix of the input (signal plus noise). This is generally more convenient as it avoids using a voice activity detector; such a beamformer is known as minimum power distortionless response (MPDR). To prevent instability due to the direction of arrival mismatch, a regularization term is added to the sample covariance matrix. In one implementation, an additional null constraint is also added with the direction to the interference. The beamformer with the extra nullforming constraint may be formulated as:

$$W^H = [1 0]([D_t | D_i]^H [R+\lambda I]^{-1} [D_t | D_i])^{-1} [D_t | D_i]^H [R+\lambda I]^{-1} \qquad (3)$$

where $D_t$ and $D_i$ are steering vectors toward the target and interference direction respectively, and $\lambda$ is the regularization term for diagonal loading. With the beam on the target and null on the interference directions, the first-tap of the feed-forward ICA filter may be initialized for appropriate channel assignment.

Additional details of beamforming/spatial processing are described in U.S. Pat. No. 7,415,117 and published U.S. Pat. Appl. nos. 20080288219 and 20080232607, herein incorporated by reference.

A combination of conventional subband domain ICA and beamforming is shown in FIG. 9. FIG. 9 shows an example block diagram of a two phase mechanism for one subband. The first phase comprises spatial filtering, which separates the sound sources by their positions.

Signals from the microphone array 204 are transformed by a suitable transform 206 (MCLT is shown as an example). In one implementation, a linear adaptive beamformer (MVDR or MPDR), combined with enforced nullformers is used for signal representation, as represented by blocks 208 and 209. This is followed by nonlinear spatial filtering (blocks 210 and 211), which produces additional suppression of the interference signals. In one implementation, the nonlinear spatial filters comprise instantaneous direction of arrival (IDOA) based spatial filters, such as described in the aforementioned published U.S. Pat. Appl. no. 20080288219. Regardless of whether the nonlinear spatial filtering is used after beamforming, the output of the spatial filtering phase comprises separated signals at a first level of separation.

The output of the spatial filtering above is used for regularization by the second phase of the exemplified two-stage processing scheme. The second phase comprises a feed-forward ICA 214, which is a modification of a known ICA algorithm, with the modification based upon using multi-tap filters. More particularly, the duration of the reverberation process is typically longer than a current frame, and thus using multi-tap filters that contain historical information over previous frames allows for the ICA to consider the duration of the reverberation process. For example, ten multi-tap filters corresponding to ten previous 30 ms frames may be used with a 300 ms reverberation duration, whereby equation (1) corresponds to the matrix generally represented in FIG. 3, where n represents the current frame. This is only one example, and shorter frames with correspondingly more taps have been implemented.

As can be seen, the mutual independence of the separated speeches is maximized by using both current and previous multi-channel frames, (multiple taps). For additional separation secondary spatial filters 215 and 216 (another non-linear spatial suppressor) are applied on the ICA outputs, which are followed by the inverse MCLT 220 and 221 to provide the separated speech signals. In general, this removes any residual interference. Regardless of whether the secondary nonlinear spatial filtering is used after regularization, the output of the second phase comprises separated signals at a second level of separation that is typically a significant improvement over prior techniques, e.g., as measured by signal-to-interference ratios.

For beamforming followed by a spatial filter, to determine the direction of arrival (DOA) of the desired and interference speech signals, an instantaneous DOA (IDOA)-based sound source localizer 222 may be used. IDOA space is M−1 dimensional with the axes being the phase differences between the non-repetitive pairs, where M is the number of microphones. This space allows estimation of the probability density function $p_k(\theta)$ as a function of the direction $\theta$ for each subband. The results from all subbands are aggregated and clustered.

Note that at this stage, the tracking system may provide additional cues to improve the localization and tracking precision. The sound source localizer provides directions to desired $\theta_1$ and interference $\theta_2$ signals. Given the proper estimation on the DOAs for the target and interference speech signals, the constrained beamformer plus nullformer according is applied as described in equation (3).

Turning to additional details, the consequent spatial filter applies a time-varying real gain for each subband, acting as a spatio-temporal filter for suppressing the sounds coming from non-look directions. The suppression gain is computed as:

$$G_k^{(n)} = \int_{\theta_1-\Delta\theta}^{\theta_1+\Delta\theta} p_k(\theta)d\theta \bigg/ \int_{-\pi}^{+\pi} p_k(\theta)d\theta, \quad (4)$$

where $\Delta\theta$ is the range around the desired direction $\theta_1$ from which to capture the sound.

With respect to regularized feed-forward ICA 214 followed by IDOA based post-processing, as described above, the time-domain source separation approach in the subband domain case is utilized by allowing multiple taps in the demixing filter structure in each subband. An update rule for the regularized feed-forward ICA (RFFICA) is:

$$W_i = W_i + \mu((1-\alpha)\cdot\Delta_{ICA,i} - \alpha\cdot\Delta_{First\ stage,i}) \quad (5)$$

where and i=0, 1, . . . , N−1, N is the number of taps. $\Delta_{ICA,i}$ and $\Delta_{First\ stage,i}$ represent the portion of the ICA update and the regularized portion on the first stage output.

$$\Delta_{ICA,i} = W_i - \langle g(S(\cdot-(N-1)))Y_{temp}^H(\cdot-i)\rangle_t \quad (6)$$

$$S(\cdot) = \sum_{n=0}^{N-1} W_n(\cdot)Y(\cdot-n) \quad (7)$$

$$Y_{temp}(\cdot) = \sum_{n=0}^{N-1} W_{N-1-n}^H(\cdot)S(\cdot-n) \quad (8)$$

$$\Delta_{First\ stage,i} = \langle(S(\cdot)|_{Ref} - S_{First\ stage}(\cdot))(Y(\cdot-i)|_{Ref})^H\rangle_t \quad (9)$$

where $\langle\cdot\rangle_t$ represents time averaging, ($\cdot$−i) represents i sample delay, $S_{First\ stage}$ is the first stage output vector for regularization and |Ref represents the reference channels. A penalty term is only applied to the channel where the references are assigned; the other entries for the mixing matrix are set to zero so that the penalty term vanishes on those channel updates.

To estimate the separation weights, equation (5) is performed iteratively for each frequency beam. The iteration may be done on the order of dozens to a thousand times, depending on available resources. In practice, reasonable results have been obtained with significantly fewer than a thousand iterations.

For initialization of the subsequent filters, the reverberation process is modeled as exponential attenuation:

$$W_i = \exp(-\beta i)\cdot I \quad (10)$$

where I is an identity matrix, $\beta$ is selected to model the average reverberation time, and i is the tap index. Note that the first tap of RFFICA for the reference channels is initialized as a pseudo-inversion of the steering vector stack for one implementation so that one can be assigned to the target direction and null to the interference direction:

$$W_{0,ini|ref} = ([e(\theta_t)|e(\theta_i)]^H[e(\theta_t)|e(\theta_i)])^{-1}[e(\theta_t)|e(\theta_i)]^H. \quad (11)$$

Because the initialized filter is updated using ICA, a slight mismatch with actual DOA may be adjusted in an updating procedure. In one implementation, $\alpha$ is set to 0.5 just to penalize the larger deviation from the first stage output. As a nonlinear function $g(\cdot)$, a polar-coordinate based tangent hyperbolic function is used, suitable to the super-Gaussian sources with a good convergence property:

$$g(X)\tan h(|X|)\exp(j\angle X) \quad (12)$$

where $\angle X$ represents the phase of the complex value X. To deal with the permutation and scaling, the steered response of the converged first tap demixing filter is used:

$$S_l = \frac{S_l}{F_l}\cdot\left(\frac{|F_l|}{\max|F|}\right)^\gamma \quad (13)$$

where l is the designated channel number, $F_l$ is the steered response for the channel output, F is the steered response to the candidate DOAs. To penalize the non-look direction in the scaling process, nonlinear attenuation is added with the normalization using the steered response. In one implementation, $\gamma$ is set as one (1). The spatial filter also penalizes on the non-look directional sources in each frequency bin.

By taking previous multi-channel frames into consideration (rather than using only current frames for instantaneous demixing), the technology described herein thus overcomes limitations of the subband domain ICA in a reverberant acoustic environment, and also increases the super-Gaussianity of the separated speech signals. The feed-forward demixing filter structure with several taps in the subband domain is accommodated with natural gradient update rules. To prevent permutation and arbitrary scaling, and guide the separated speech sources into the designated channel outputs, the estimated spatial information on the target and interference may be used in combination with a regularization term added on the update equation, thus minimizing mean squared error between separated output signals and the outputs of spatial filters. After convergence of the regularized feed-forward demixing filter, improved separation of the speech signals is observed, with audible late reverberation for both desired and interference speech signals. These reverberation tails can be substantially suppressed by using spatial filtering based on instantaneous direction of arrival (IDOA), giving the probability for each frequency bin to be in the original source direction. This post-processing also suppresses any residual interference speech coming from non-look directions.

The output of blocks 220 and 221 are the respective speech utterances of each user. These outputs are provided to the communications controller for provision to teammates as directed by the application.

Figure 10:
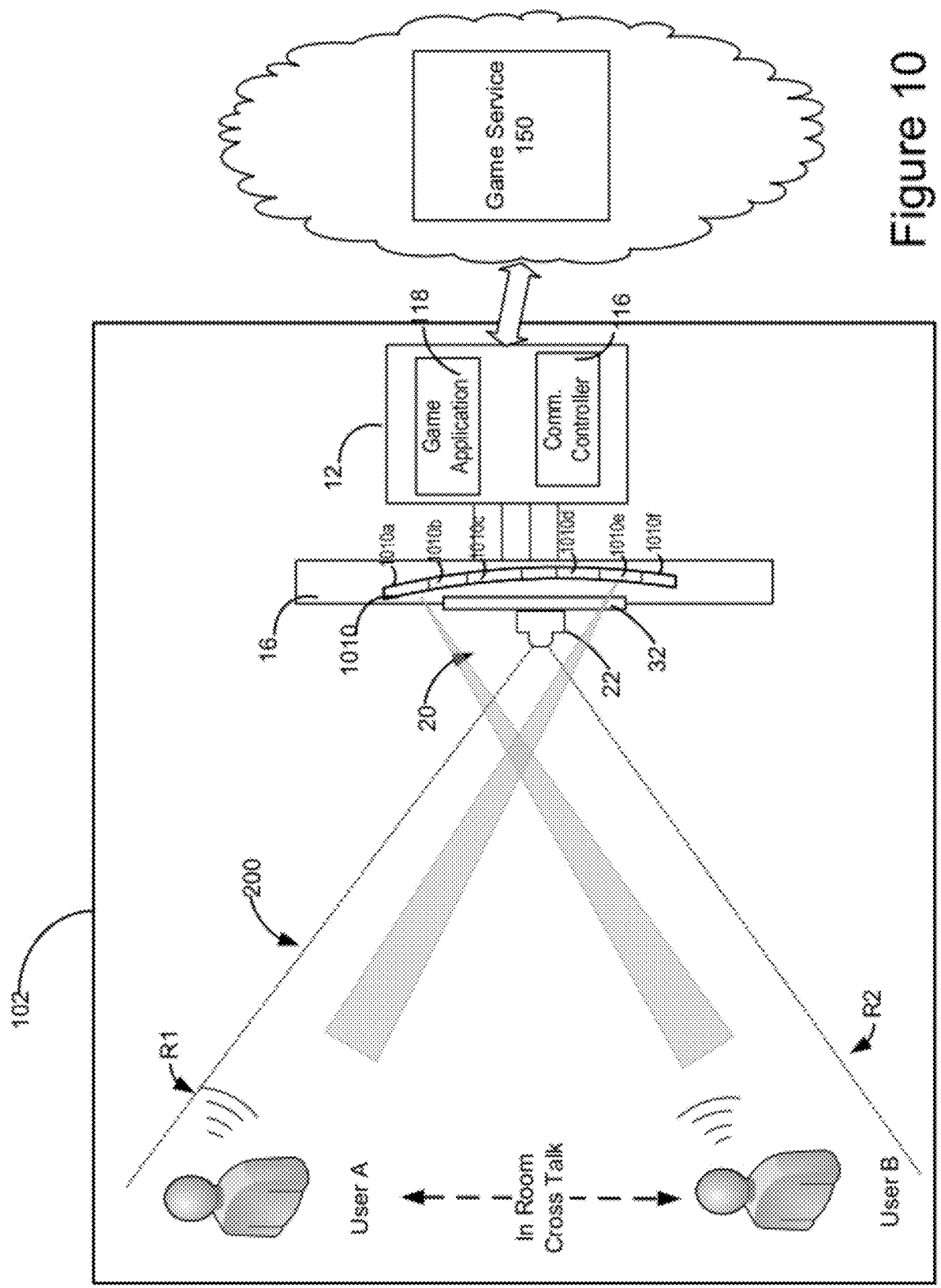
FIG. 10 is a representation of a first output system in accordance with the present technology.

FIG. 10 illustrates technology for directing user utterances to individual users within the localized environment. FIG. 10 illustrates a first embodiment for directing an output to a user. In FIG. 10, the capture device 20 receives input from user A and user A within a field of view between R1-R2 which is detected by a camera 22. Microphone array 32 can detect utterances within the physical environment 102. In order to direct sound to one or both of users A and B individually, an ultrasonic speaker 1010 array can be utilized. Array 1010 may comprise a plurality of individual ultrasonic speakers 1010*a*-1010*f* such as the "Audio Spotlight"® brand speaker from Holosonics® Corporation, Watertown, Mass. An ultrasonic speaker uses a beam of ultrasound as a virtual acoustic source enabling focused control of sound distribution. With an array of speakers of this type, the communications controller 116 may direct an utterance to a speaker having a directional relationship to output sound in the direction of the intended recipient. One or more sound directed speakers 1010 can be utilized to direct utterances from a teammate directly at user A or user B.

Any form of array of ultrasonic speakers having an angled orientation relative to each other, thereby allowing sound to be directed to an individual speaker most likely to be directed to the target user, may be utilized.

Figure 11:
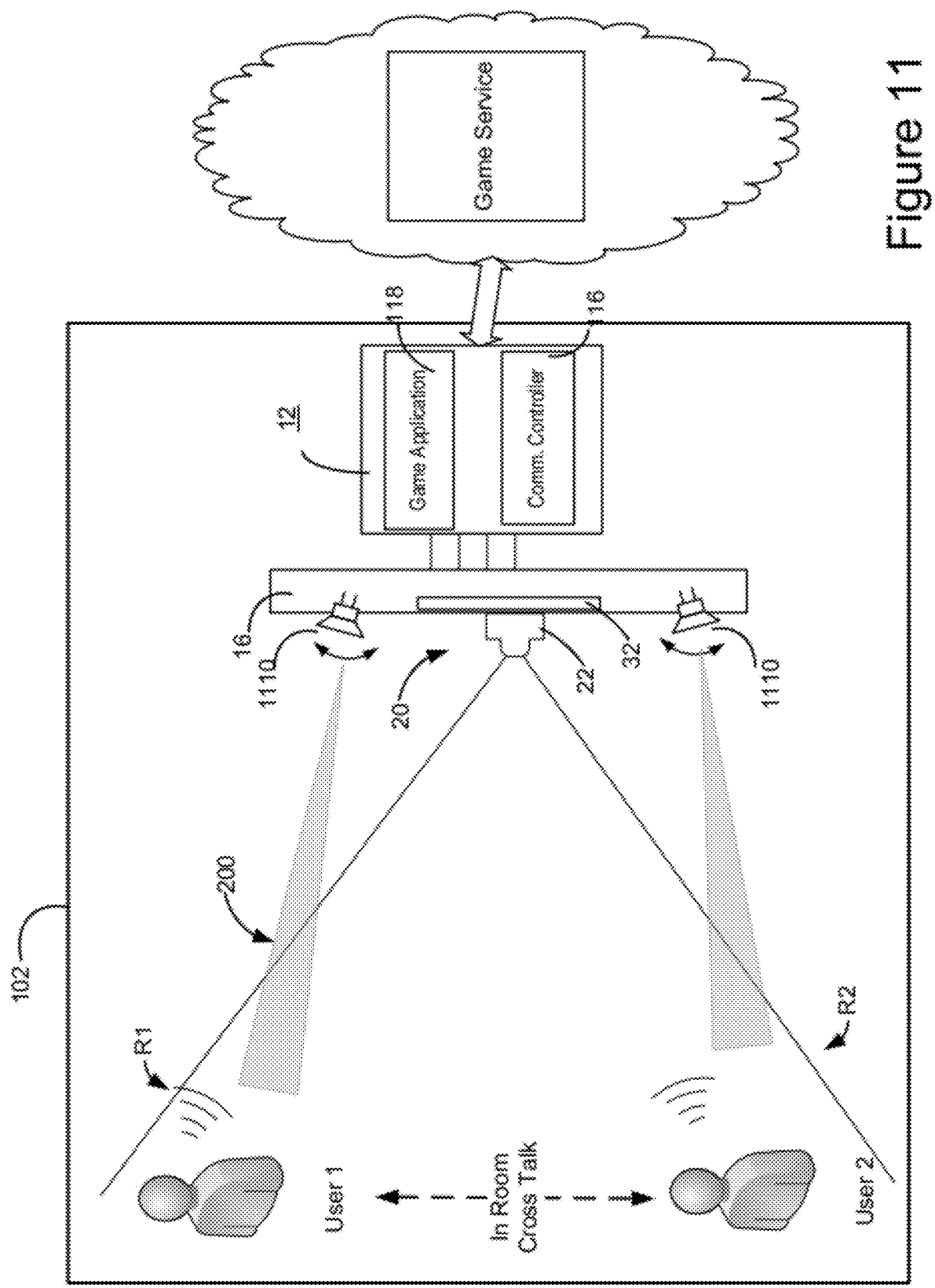
FIG. 11 is a representation of a second output system in accordance with the present technology.

Alternatively, as illustrated in FIG. 11, individual loud speakers or ultrasonic speakers having rotational movement under the control of a communications controller may be used as illustrated in FIG. 11. Speakers 1110 and 1112 illustrated in FIG. 11 may be ultrasonic speakers or may be conventional speakers which have the ability to move to direct their output 1014, 1015 directly at the specific user. Communications controller 16 will direct output from respective other players and teammates to the correct user. Each speaker may be mounted to a rotatable motor allowing the controller to position the speaker at a direction related to the known position of the user in the room (through tracking or through localized voice determination). Although some in room cross talk will be unavoidable between the players, the game play will distract users to the extent that the information should not be distracting.

Figure 12:
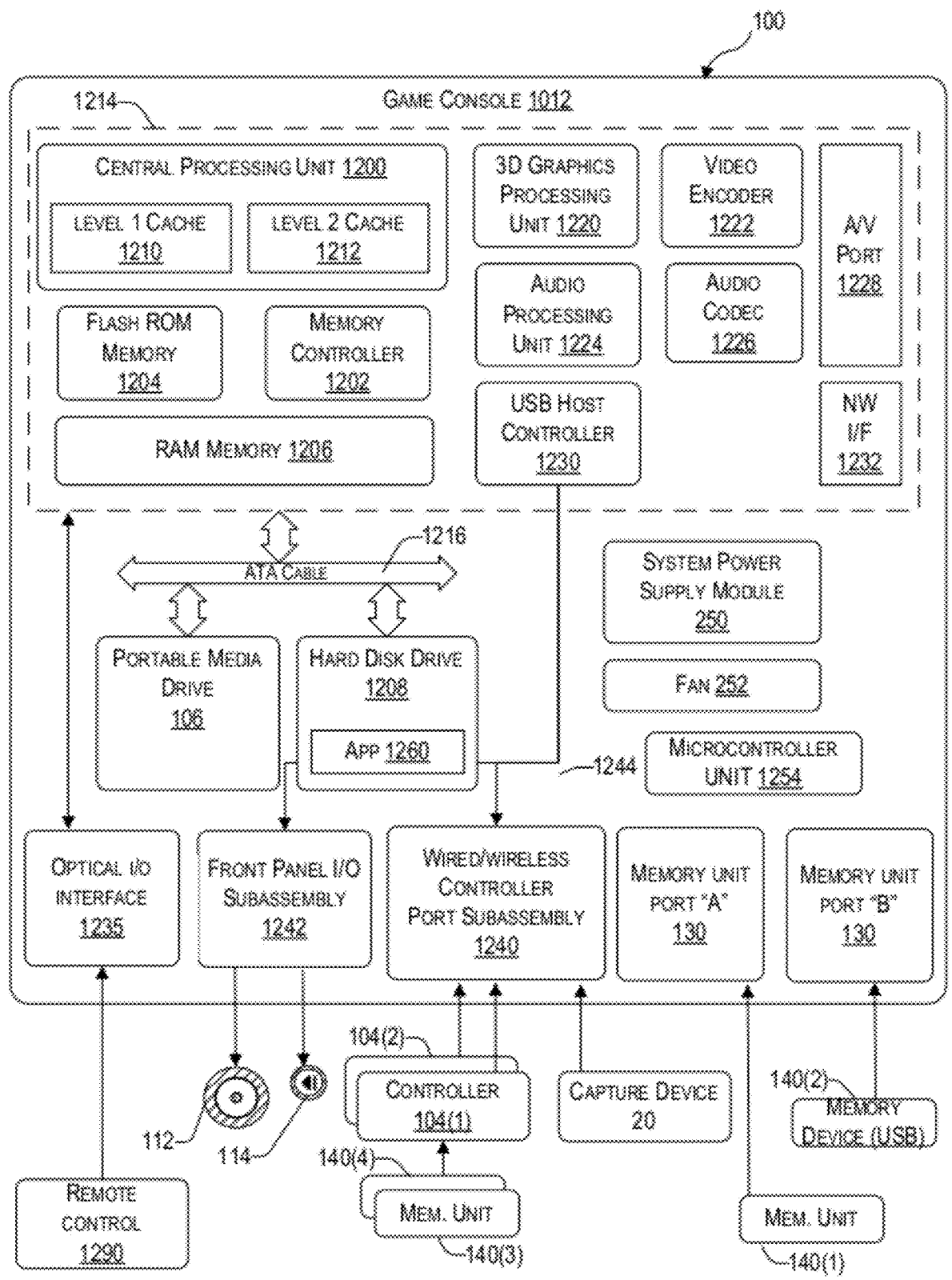
FIG. 12 illustrates an example embodiment of a computing environment that may be used to interpret one or more gestures in a target recognition, analysis and tracking system.

FIG. 12 illustrates an example embodiment of a computing environment that may be used to interpret one or more gestures in a target recognition, analysis, and tracking system. The computing environment such as the computing environment 12 described above with respect to FIGS. 1-3 may be a multimedia console 1012, such as a gaming console. As shown in FIG. 12, the multimedia console 100 has a central processing unit (CPU) 1200, and a memory controller 1202 that facilitates processor access to various types of memory, including a flash Read Only Memory (ROM) 1204, a Random Access Memory (RAM) 1206, a hard disk drive 1208, and portable media drive 106. In one implementation, CPU 1200 includes a level 1 cache 1210 and a level 12 cache 1212, to temporarily store data and hence reduce the number of memory access cycles made to the hard drive 1208, thereby improving processing speed and throughput.

CPU 1200, memory controller 1202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 1200, memory controller 1202, ROM 1204, and RAM 1206 are integrated onto a common module 1214. In this implementation, ROM 1204 is configured as a flash ROM that is connected to memory controller 1202 via a PCI bus and a ROM bus (neither of which are shown). RAM 1206 is configured as multiple Double Data Rate Synchronous Dynamic RAM (DDR SDRAM) modules that are independently controlled by memory controller 1202 via separate buses (not shown). Hard disk drive 1208 and portable media drive 106 are shown connected to the memory controller 1202 via the PCI bus and an AT Attachment (ATA) bus 1216. However, in other implementations, dedicated data bus structures of different types can also be applied in the alternative.

A graphics processing unit 1220 and a video encoder 1222 form a video processing pipeline for high speed and high resolution (e.g., High Definition) graphics processing. Data are carried from graphics processing unit 1220 to video encoder 1222 via a digital video bus (not shown). An audio processing unit 1224 and an audio codec (coder/decoder) 1226 form a corresponding audio processing pipeline for multi-channel audio processing of various digital audio formats. Audio data are carried between audio processing unit 1224 and audio codec 1226 via a communication link (not shown). The video and audio processing pipelines output data to an A/V (audio/video) port 1228 for transmission to a television or other display. In the illustrated implementation, video and audio processing components 1220-228 are mounted on module 1214.

FIG. 12 shows module 1214 including a USB host controller 1230 and a network interface 1232. USB host controller 1230 is shown in communication with CPU 1200 and memory controller 1202 via a bus (e.g., PCI bus) and serves as host for peripheral controllers 104(1)-104(4). Network interface 1232 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 12, console 1012 includes a controller support subassembly 1240 for supporting four controllers 104(1)-104(2). The controller support subassembly 1240 includes any hardware and software components needed to support wired and wireless operation with an external control device, such as for example, a media and game controller.

The cameras 26, 28, array 32 and capture device 20 may define additional input devices for the console 100.

A front panel I/O subassembly 1242 supports the multiple functionalities of power button 1112, the eject button 1114, as well as any LEDs (light emitting diodes) or other indicators exposed on the outer surface of console 1012. Subassemblies 1240 and 1242 are in communication with module 1214 via one or more cable assemblies 1244. In other implementations, console 1012 can include additional controller subassemblies. The illustrated implementation also shows an optical I/O interface 1235 that is configured to send and receive signals that can be communicated to module 1214.

MUs 140(1) and 140(2) are illustrated as being connectable to MU ports "A" 1213(1) and "B" 1213(2) respectively. Additional MUs (e.g., MUs 140(3)-140(4)) are illustrated as being connectable to controllers 1104(1) and 1104(3), i.e., two MUs for each controller. Controllers 1104(2) and 1104(4) can also be configured to receive MUs (not shown). Each MU 140 offers additional storage on which games, game parameters, and other data may be stored. In some implementations, the other data can include any of a digital game component, an executable gaming application, an instruction set for expanding a gaming application, and a media file. When inserted into console 1012 or a controller, MU 1140 can be accessed by memory controller 1202. A system power supply module 1250 provides power to the components of gaming system 100. A fan 1252 cools the circuitry within console 102.

An application 1260 comprising machine instructions is stored on hard disk drive 1208. When console 1012 is powered on, various portions of application 1260 are loaded into RAM 1206, and/or caches 1210 and 1212, for execution on CPU 1200, wherein application 1260 is one such example. Various applications can be stored on hard disk drive 1208 for execution on CPU 1200.

Gaming and media system 1200 may be operated as a standalone system by simply connecting the system to an audiovisual device 16 (FIG. 2), a television, a video projector, or other display device. In this standalone mode, gaming and media system 1200 enables one or more players to play games, or enjoy digital media, e.g., by watching movies, or listening to music. However, with the integration of broadband connectivity made available through network interface 1232, gaming and media system 1200 may further be operated as a participant in a larger network gaming community.

Figure 13:
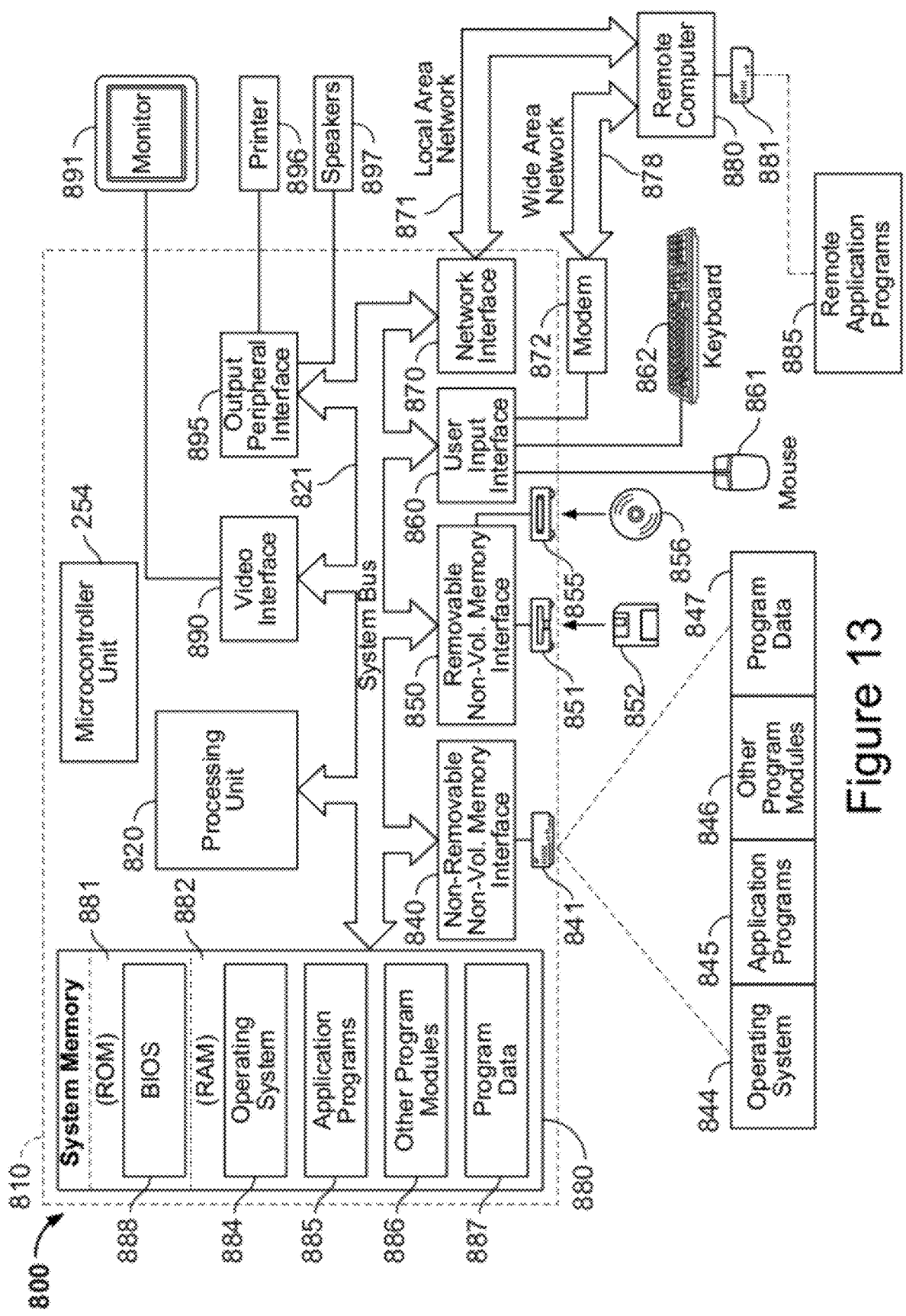
FIG. 13 illustrates another example embodiment of a computing environment that may be used to interpret one or more gestures in a target recognition, analysis and tracking system.

FIG. 13 illustrates a general purpose computing device which can be used to implement another embodiment of computing device 12. With reference to FIG. 13, an exemplary system for implementing embodiments of the disclosed technology includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 830 includes computer storage media in the form of volatile and/or nonvolatile memory such as read only memory (ROM) 831 and random access memory (RAM) 832. A basic input/output system 888 (BIOS), containing the basic routines that help to transfer information between elements within computer 810, such as during start-up, is typically stored in ROM 881. RAM 882 typically contains data and/or program modules that are immediately accessible to and/or presently being operated on by processing unit 820. By way of example, and not limitation, FIG. 12 illustrates operating system 884, application programs 885, other program modules 886, and program data 887.

The computer 810 may also include other removable/non-removable, volatile/nonvolatile computer storage media. By way of example only, FIG. 5 illustrates a hard disk drive 840 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 20 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 890.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 13. The logical connections depicted in FIG. 13 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 13 illustrates remote application programs 885 as residing on memory device 881. It will be appreciated that the network connections shown are exemplary and other means of establishing a communications link between the computers may be used.

While the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed is:

1. A method of providing a semi-private conversation between a local user and a remote user, comprising:

receiving by way of each of an array of plural microphones, both of a first voice output from a respective first local user and a second voice output from a respective second local user, said first and second local users being situated in a sound-sharing first physical environment in which the first and second local users are in a two-way sound cross-talk relationship with one another and in which the microphone array is also situated;

using the microphone array to localize a respective origin position in the first physical environment for each of the first and second received voice outputs, the respective origin positions corresponding to respective locations of the first and second local users in the first physical environment;

associating the localized voice outputs with the correspondingly located first and second local users;

using the microphone array to isolate the respective voice output of a selected one of the first and second local users from other sounds present in the sound-sharing first physical environment;

directing the isolated voice output of the selected local user to a selected third user in a second physical environment, where sounds in the first physical environment are not propagated to the second physical environment;

receiving isolated utterances from the third user in the second physical environment; and routing the utterances to the selected local user in the first physical environment.

2. The method of claim 1 further including the step of tracking user locations in the first physical environment and focusing a sound isolating function of the microphone array on a tracked one of the tracked user locations.

3. The method of claim 2 further including tracking user location by detecting user location in a field of view of a depth image camera.

4. The method of claim 3 further including the step of recording a voice print of a tracked user and associating the voice print with a skeletal model of the tracked user.

5. The method of claim 1 further including the step of determining a conversational relationship between the selected local user and another user in the second physical environment.

6. The method of claim 5 wherein the conversational relationship comprises the selected local user and the other user in the second physical environment acting as teammates in a game.

7. The method of claim 1 wherein routing comprises providing isolated utterances from the third user to a directional output aimed at the selected local user.

8. The method of claim 1 wherein the step of localization includes combining spatial filtering with regularization on the received voice output to thereby provide at least two corresponding outputs.

9. A system including at least a motion capture subsystem and an audio input subsystem, the system comprising:
- a motion capture device including at least one array of plural microphones arranged in a housing including the plural microphones, the housing positioned in a sound-sharing first physical environment and configured to receive speech input from any of a plurality of users in the first physical environment;
- a processing device including instructions causing the processing device to:
  - use the microphone array to localize a source location within the first physical environment of a voice received via the microphones from a first user of the plurality of users in the first physical environment;
  - associate the voice of the localized source location with the first user;
  - use the microphone array to isolate utterances made in the localized source location by the voice that has been associated with the first user in the first environment; and
  - direct the isolated utterances of the first user in the first environment to a selected second user in a second environment, where sounds in the first physical environment are not propagated to the second physical environment; and
- a directional audio output device coupled to the processing device and configured to direct audio output from a remote user specifically to the localized source location associated with the first user.

10. The system of claim 9 wherein the instructions further include ones causing a tracking of at least a first local user and a second local user in a first physical environment, each local user having a conversational relationship with a remote user in a second physical environment.

11. The system of claim 9 wherein the instructions further include ones causing a receiving of isolated utterances from the second user in the second physical environment and a routing of the utterances to the first user in the first physical environment.

12. The system of claim 9 wherein the directional audio output device comprises an array of ultrasonic speakers.

13. The system of claim 9 wherein the directional audio output device comprises at least a first movable speaker and a second movable speaker.

14. A method providing a semi-private communications between local users situated in a sound-sharing first physical environment and remote users situated in a second physical environment that is not in a sound-sharing relation with the first physical environment, the local users and remote users connected via a network, the method comprising:
- tracking at least a first local user and a second local user in the first physical environment, each local user having a conversational relationship with a remote user in the second physical environment;
- receiving voice input from at least the first local user and the second local user in the first physical environment via a corresponding one or more of multiple microphones in a microphone array situated in the sound-sharing first physical environment, each microphone in the array configured to receive and to participate in respective acoustic localization of respective speech input from a respective one of the first local user and the second local user;
- using the microphone array of the first physical environment for associating an acoustically localized voice as being sourced from a respective one of the first local user and the second local user;
- using the microphone array of the first physical environment for isolating utterances of the first local user;
- routing isolated utterances of the first user in the first environment to a selected first remote user in the second environment;
- using the microphone array of the first physical environment for isolating utterances of the second local user; and
- routing the isolated utterances of the second user in the first environment to a selected second remote user in the second environment,
- wherein the steps of isolating include combining spatial filtering with regularization on the input to provide an isolated output.

15. The method of claim 14 wherein the method further includes the step of tracking user locations in the physical environment and focusing a sound sensitivity area of the microphone array on the user location.

16. The method of claim 15 wherein routing comprises providing the isolated utterances from the second user to a directional output aimed at the first user.

17. The method of claim 16 further including the step of receiving isolated utterances from the first remote user in the second physical environment and routing the utterances to the first local user in the first physical environment.

18. The method of claim 17 wherein at least one of the first remote user and the second remote user utilizes a headset, whereby the headset utilizing user is not in an equal sound cross-talk relationship with other users of the same remote physical environment; and
- neither of at least first and second local users situated in the sound-sharing first physical environment utilizes a headset, whereby the first and second local users are in an equal sound cross-talk relationship with one another.

* * * * *